B. D. STRAIGHT.
BUTTER DISPENSING APPARATUS.
APPLICATION FILED MAR. 22, 1915.

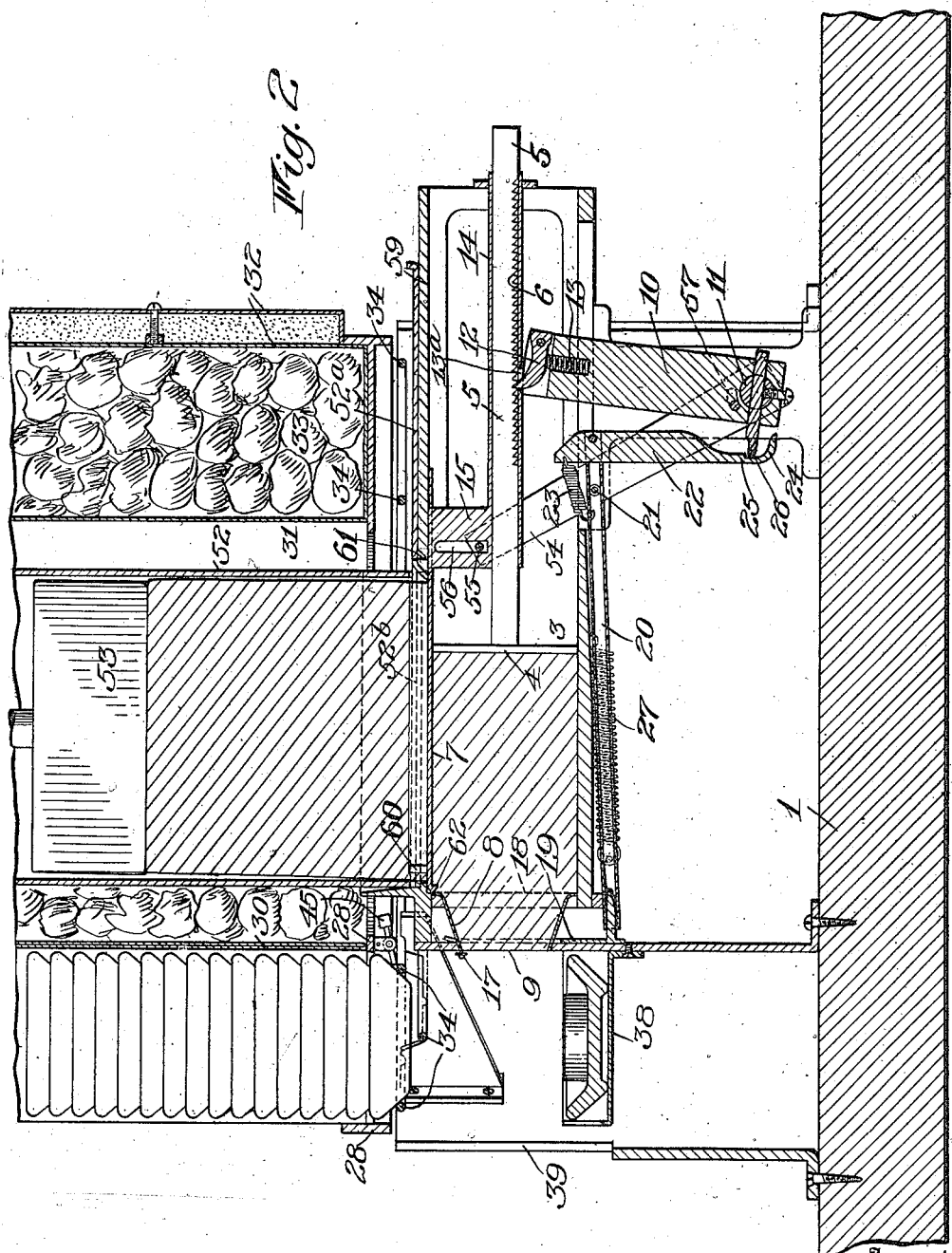

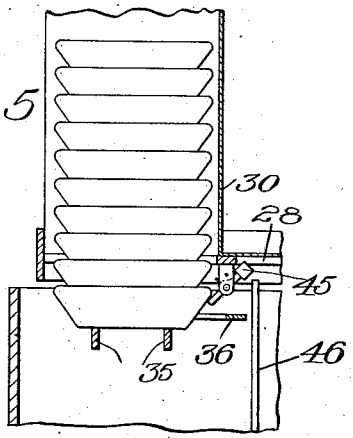
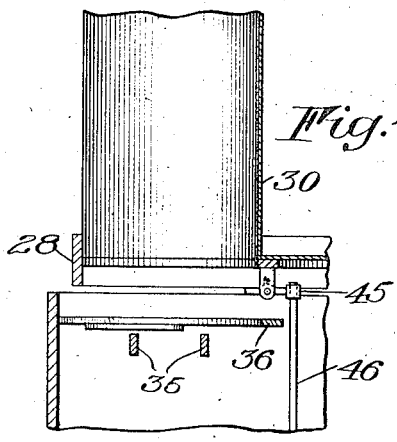
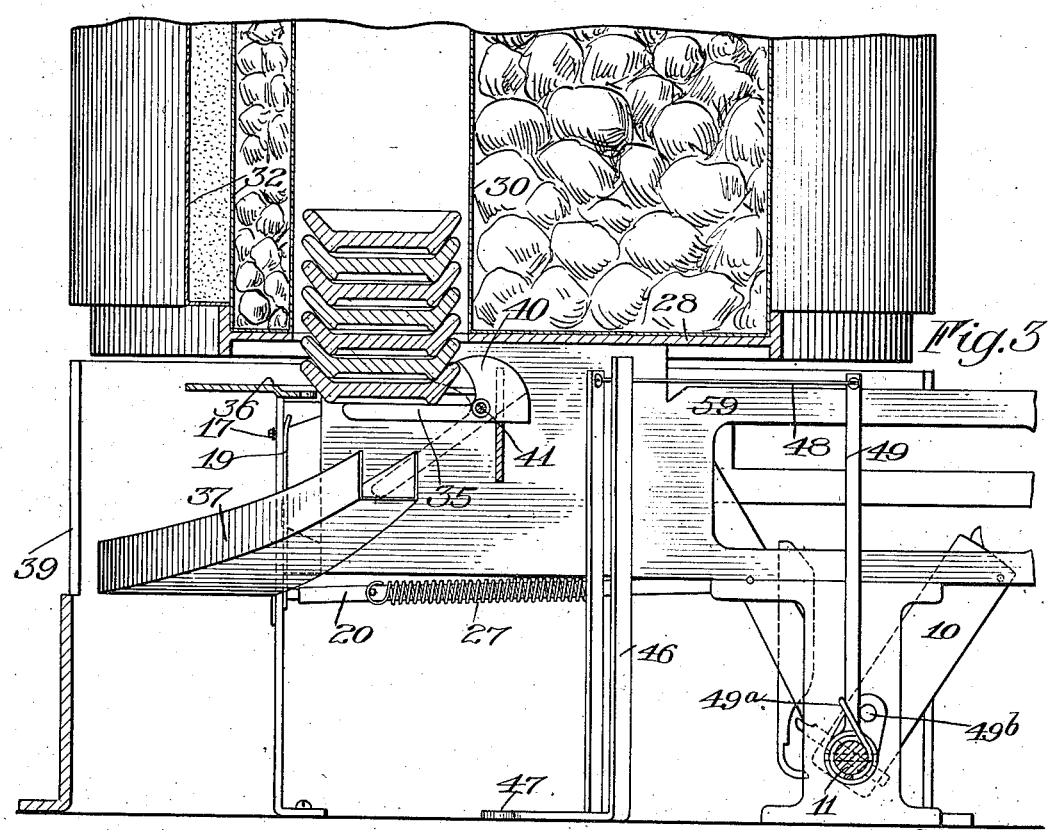

1,146,972.

Patented July 20, 1915.
5 SHEETS—SHEET 4.

Witnesses
Walter B. Payne
Nelson H. Copp

Inventor
Bennett D. Straight
By Church & Rich
his Attorneys

B. D. STRAIGHT.
BUTTER DISPENSING APPARATUS.
APPLICATION FILED MAR. 22, 1915.
1,146,972.
Patented July 20, 1915.
5 SHEETS—SHEET 5.
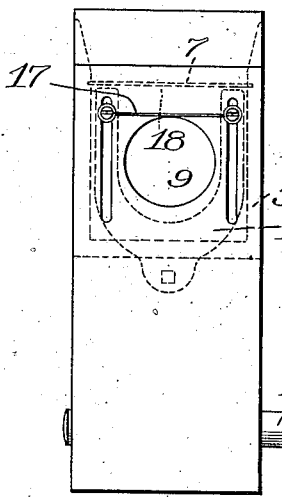
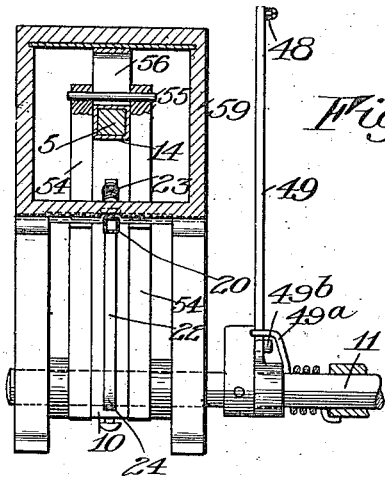
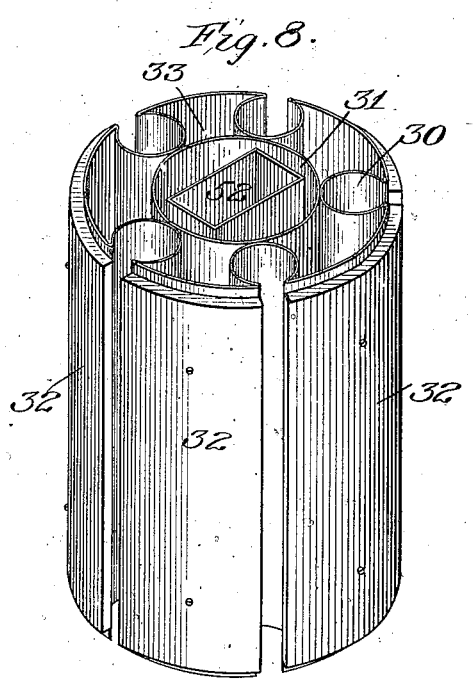
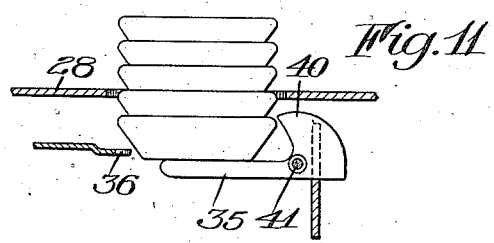
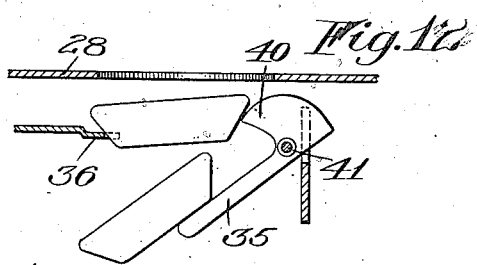
Witnesses
Walter B. Payne
Nelson H. Copp
Inventor
Bennett D. Straight
By Chuck Rich
his Attorneys

UNITED STATES PATENT OFFICE.

BENNETT D. STRAIGHT, OF ROCHESTER, NEW YORK, ASSIGNOR TO ROCHESTER MONETOR COMPANY INC., OF ROCHESTER, NEW YORK, A CORPORATION OF NEW YORK.

BUTTER-DISPENSING APPARATUS.

1,146,972.   Specification of Letters Patent.   Patented July 20, 1915.

Application filed March 22, 1915. Serial No. 16,053.

*To all whom it may concern:*

Be it known that I, BENNETT D. STRAIGHT, of Rochester, in the county of Monroe and State of New York, have invented certain new and useful Improvements in Butter-Dispensing Apparatus; and I do hereby declare the following to be a full, clear, and exact description of the same, reference being had to the accompanying drawings, forming a part of this specification, and to the reference-numerals marked thereon.

The invention relates to a dispensing apparatus, and has for its object to afford certain improvements intended especially for furnishing relatively small portions or patties of butter from a larger mass of butter, the machine being designed for use in lunch rooms, hotels, restaurants, and similar places where it is desirable to produce a large number of individual servings of butter.

A further object of the invention is to provide for automatically discharging a patty onto an empty plate, the plate having been brought into position to receive the patty, prior to its discharge, so that it can be readily removed from the machine.

Another purpose of the invention resides in constructing and arranging the parts in such a manner as to result in a maximum speed of operation and degree of efficiency, together with simplicity of parts which obviates to a large extent likelihood of disarranging the mechanism when operated by unskilled hands.

To these and other ends the invention consists in certain improvements and combinations of parts, all as will be hereinafter more fully described, the novel features being pointed out in the claims at the end of the specification.

Figure 1:
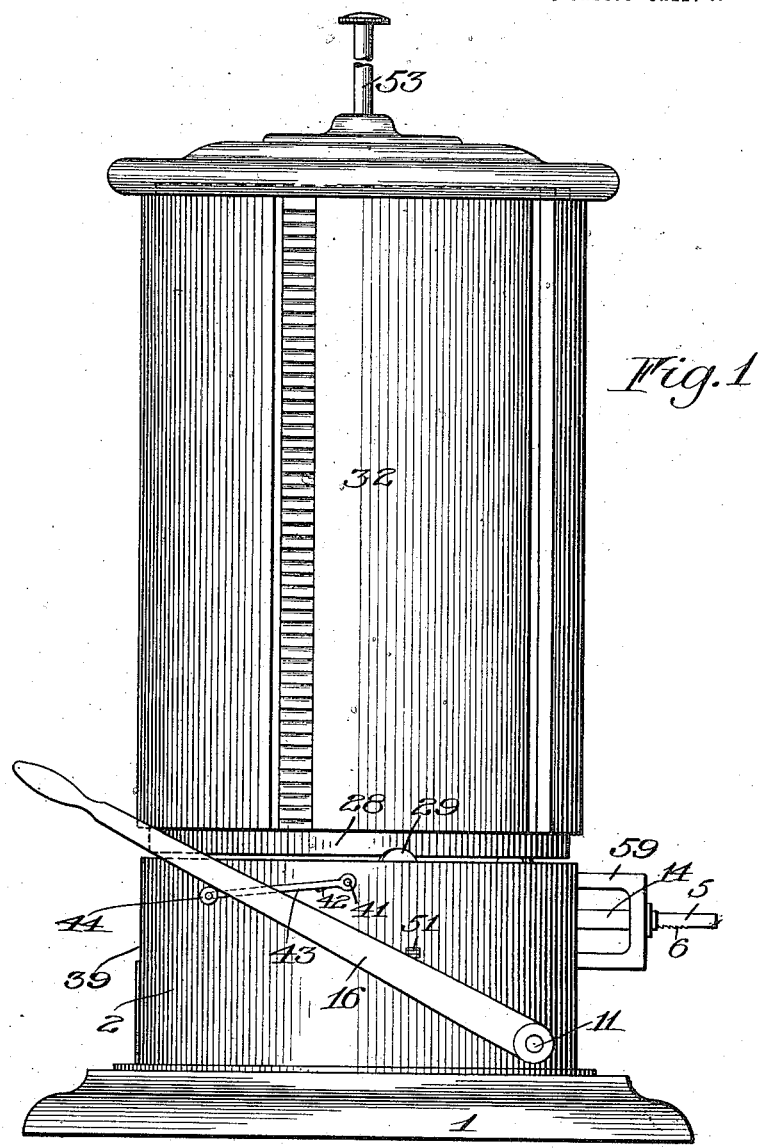
Figure 6:
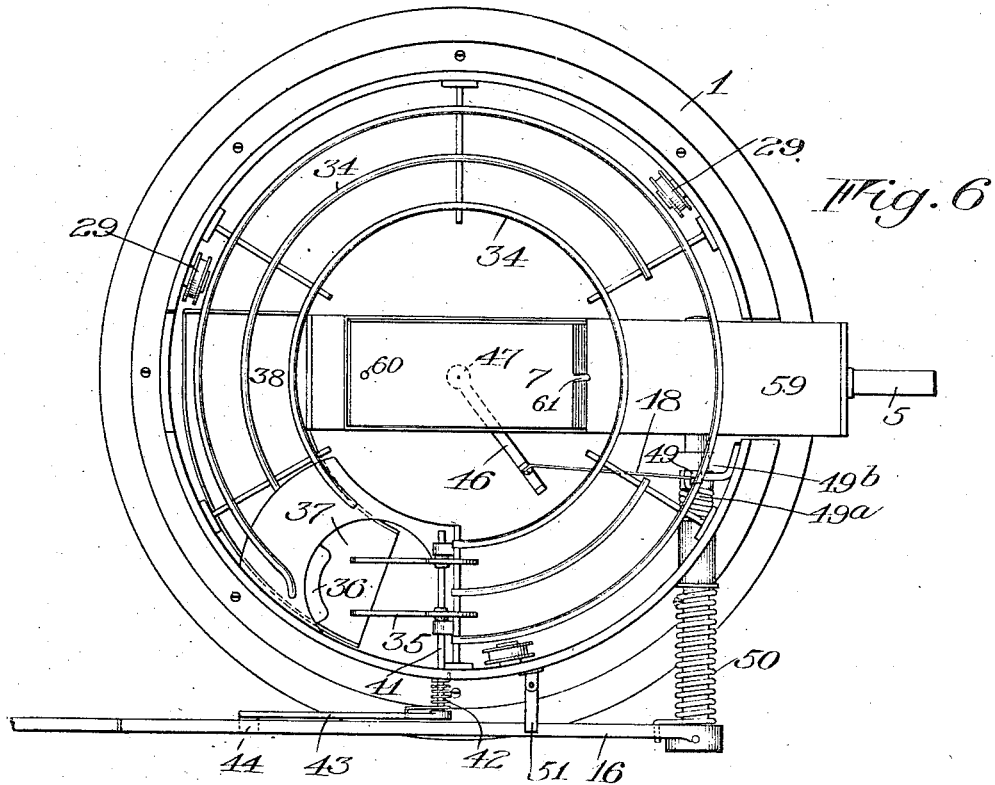
Figure 7:
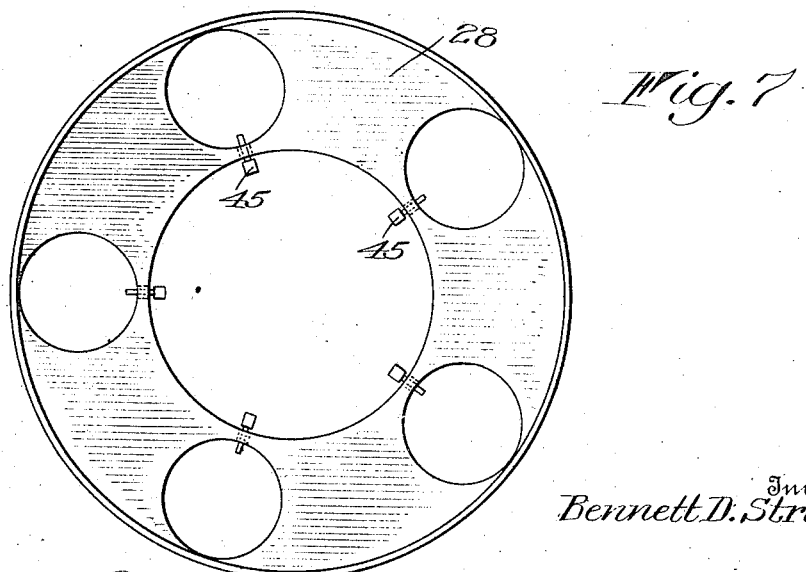

In the drawings: Figure 1 is a side elevation of a machine equipped with one embodiment of the invention; Fig. 2 is a vertical sectional view showing the controlling mechanism; Fig. 3 is an elevation of the mechanism shown in Fig. 1 with parts in section; Fig. 4 is a sectional view of one of the plate holding sections, showing the position of the parts when empty; Fig. 5 is a similar view, the section being filled with plates; Fig. 6 is a plan view with the plate carrier removed; Fig. 7 is a plan view of the plate carrier support; Fig. 8 is a perspective view of the plate carrier and butter container; Fig. 9 is a side elevation, showing the cutting member; Fig. 10 is a sectional view through the butter compartments; Fig. 11 is a sectional view showing the plate supporting device, and Fig. 12 is a similar view showing the position of the plate supporting device in the act of releasing an empty plate.

Similar reference characters throughout the several figures indicate the same parts.

The invention set forth in this application may be carried out in various ways other than the particular embodiment herein shown and described and it is to be understood that the mechanism illustrated and described in detail is intended merely as one exemplification of means by which the desired result may be accomplished.

In the illustrations, 1 designates the base on which is mounted a circular supporting frame or drum 2 in which is mounted a container 3 for the butter, or other material to be dispensed, within which operates an ejector. The latter comprises a follower 4 mounted on the piston 5, provided with a series of rack teeth 6 on its lower edge. The container 3 is closed by a sliding top plate 7, which is movable for a purpose that will appear hereinafter, and at its forward end the container is provided with a neck 8 which is tapered, as shown, and forms a reduced or restricted discharge opening 9 through which the material is ejected. The ejector 4 is controlled in its movement by suitable actuating means which, in the present embodiment of the invention, comprises a rock arm 10 fixed on a shaft 11 and carrying a pivoted pawl 12 controlled by a spring 13 and arranged to advance the plunger 4 a predetermined distance at each oscillation of the shaft 11. The operating shaft 11 is controlled by the main lever or prime mover 16 which is fixed thereon and is adapted to be depressed and elevated once for each operation. The normal position of the arm 10 appears in Fig. 3, and Fig. 2 shows its position after it has engaged the rack bar and moved the ejector the required distance. Owing to the reduction in size of the discharge opening 9, and the comparatively large area of the ejector, a very slight movement of the latter is sufficient to force through the discharge opening a sufficient quantity of butter for an individual service.

Owing to the peculiar resilient character of a substance like butter when subjected to pressure, there is a tendency for it to resume its normal or expanded condition prior to the application of pressure and this tendency has the effect of moving the ejector rearwardly slightly, after pressure on the handle 16 is released. With this in view the ejector is freed from the actuator and permitted to make a partial return movement to accommodate the expansive action of the butter. In practice this is accomplished by arranging the parts, as follows. Assuming that if the ejector moves through the distance of one notch on the rack bar to discharge a single patty, the parts will be so proportioned as to cause the arm 10 to move the rack bar through a distance slightly greater than the length of one notch, and possibly as much as a notch and a half and when the arm 10 is disengaged, the ejector will be returned until its total travel is equal to only one notch and the rack bar will be in such position that the pawl 12 will engage the next succeeding tooth of the rack on the following operation. After the ejecting operation is complete, it is desirable to separate the ejected portion from the main body of the mass, and for this purpose I employ a cutting member that is movable transversely of the discharge opening and is preferably controlled by the ejector actuating means before described, whereby the operation of the cutting member is effected after each forward movement of the ejector. The cutting member operates on its advance stroke to cut or separate the patty or individual portion from the main body of material, and on its return stroke to knock the severed portion away from the body of material, causing it to fall into an empty plate which is brought into position in a manner that will presently be described, and in order to accomplish this the cutting member is given a quick return movement, while its advance or cutting stroke is comparatively slow. The cutting member is preferably formed by a wire 17 moving in a path in front of the discharge opening 9 of the compartment, and to this end it is mounted on a sliding yoke member 19 which is reciprocated by a rod 20, the latter being pivotally mounted on a fixed axis 21. Carried on the rod 20 is a pivoted lever 22 yieldingly held in one position by a spring 23, as shown in Fig. 2. The lower end of the lever 22 carries a tail piece 24 and is provided with a shoulder 25 which coöperates with a projection 26 on the arm 10. When the parts are in the normal position, as shown in Fig. 3, the projection 23 is disengaged from the shoulder 25. On the downward movement of lever 16, the arm 10 advances the ejector, and at the limit of such movement, it assumes substantially the position shown in full lines in Fig. 2, where the projection 26 has engaged beneath the shoulder 25. On the return or upward stroke of lever 16, the latch engagement between the shoulder 25 and projection 26 causes the lever 22 to be moved upwardly, thereby rocking the rod 20 about its axis 21 and imparting a corresponding downward movement to the cutting member 17. The upward movement of the lever 22 is sufficient to cause the cutting member to entirely traverse the discharge opening 9, and by the time the cutting member has reached its lowermost position the arm 10 will have traveled far enough on its return movement to carry the projection 26 past the shoulder 25, and when this disengagement takes place the rod 20 is returned quickly to its initial position by means of a spring 27 which is connected to the rod and to a stationary part of the machine. The action of spring 27 effects a quick return movement of the cutting member 17 which thereby disassociates the patty from the material in the compartment and causes it to fall onto the empty plate which is provided.

In order to receive each of the discharged portions of material on a plate I employ a mechanism controlled by the ejector actuating means which operates automatically to feed an empty plate to a point beneath the discharge opening prior to each operation of the cutting member. In accomplishing this I employ a stationary support, a plate magazine and plate feeding devices working in conjunction with the ejector and cutter. If desired a plurality of magazines may be provided, which are preferably arranged on a rotary carrier, comprising a base or support 28 movably supported on the flanged rollers 29 secured to the frame 2. The support 28 carries a series of plate holding sections 30 arranged adjacent to an interior chamber 31 and insulated by outer double walls 32, the space between which may be filled with any suitable insulating substance. The space between the respective plate holding magazines and around the inner chamber 31 is adapted to be filled with ice, or other refrigerating means, in order to chill the butter and plates, within the container 52, which is located centrally in carrier and directly above the compartment 3.

The empty plates are arranged in tiers in the various magazines and rest upon the stationary rods 34, excepting at the discharge point where they rest upon a pair of arms 35 in conjunction with a flange 36. A chute 37 leads from a point beneath the arms 35 to a stationary support 38 disposed beneath the discharge opening 9 and in rear of an opening 39 in the drum 2, through which the plate may be removed after it is filled. The arms 35 constitute an escapement coöperating with the lowermost plate of the tier of plates in such a manner as to release it before each operation of the cutting member. Each of the arms 35 carries an extension or tail piece 40 which coöperates with the plate above the one discharged to prevent its removal, said arms being mounted on a rock shaft 41 which is held in normal position, as shown in Fig. 11, by a spring 42, and carries a lever 43 having a roller 44 arranged to be engaged by the main lever 16, when the latter is operated. Thus when the lever 16 is depressed the shaft 41 is rocked to the position shown in Fig. 12, to release the bottom plate into the chute 37 along which it gravitates onto the support 38 into position to receive the discharged portion of the material. The extensions 40 of the escapement arms engage the next adjacent plate and in conjunction with the flange 36, prevent its removal, holding it until the arms 35 have been raised far enough to reëngage the tier of plates, after which the parts are in readiness for another operation. When the plates are exhausted from one section of the plate carrier, it is necessary to rotate the carrier in order to bring another tier of plates into feeding position, and this is preferably accomplished automatically in the following manner. The support 28 of the plate carrier is provided with a series of pivoted arms 45 which are weighted and normally occupy the position shown in Fig. 5 when a section contains one or more plates, one of such arms being provided for each plate holding magazine. The weighted end of the arm is held raised by engagement of the plate with the inner end of the arm, and when the last plate has been delivered the outer end of the arm drops to the position shown in Fig. 4 where it is engaged by an intermittently operated member which thereby rotates the carrier far enough to bring another plate magazine into feeding position. For this purpose, a lever 46 is provided pivoted at 47 and connected to the shaft 11 by a suitable connection 48 which is loosely secured to the lever 46 and to an arm 49 on the shaft 11. By this mechanism, the lever 46 is moved past one of the arms 45 at each operation of the main lever 16, and if the arm 45 is in the position shown in Fig. 4, the lever 46, on its return movement, engages the arm 45 and rotates the plate carrier a distance corresponding to the space between adjacent plate magazines. The lever 16 is returned to its normal position by a spring 50 and its upward or return movement is limited by a stop 51.

Relatively large quantities of the butter are supplied to the machine and contained in the main magazine 52 which is preferably removable, but is associated with the compressing compartment 3 so that the latter may be conveniently filled periodically. The lower end of the magazine is closed by a slide or cut off 52$^a$, guided in ways 52$^b$. The cover 7 of the compartment 3 lies directly beneath the cut off slide. When the compartment 3 is empty it is necessary to withdraw the slide and top member and also to retract the ejector 4 to its normal position. In order to effect this movement the top 7 is provided with a cross head 15 depending in rear of the ejector 4 and connected to a sleeve 14 guided on the piston 5. Operating connections are provided between the member 7 and the prime mover 16 comprising a connecting bar 54 journaled on the shaft 11 and having a slot and pin connection, as indicated at 57, with the rock arm 10 whereby a limited oscillatory movement of the latter is permitted independently of the arm 54. The outer end of the latter is provided with a pin 55 which reciprocates in a slot 56 in the cross head 15. By this arrangement of the parts it will be observed that when the stop 51 is removed from the path of the lever 16 abnormal upward movement of the lever will cause the arm 54 to retract the top plate or cover 7 of the compressing compartment. The cover 7 carries on its upper side a pin 60 which coöperates with the cut off slide 52$^a$ and on its lower edge it is provided with the shoulder 62 which engages the ejector 4 and simultaneous retraction of the cut off slide and ejector is accomplished by the opening movement of the cover 7.

After the compartment 3 has been filled the rotation of the lever 16 to the normal position shown in Fig. 1 closes the cover 7 thereby separating the smaller portion of the mass in the container 3 from the body of material in the magazine 52 and the slide 52$^a$ may be moved into its normal position by hand, its forward inclined end moving over the surface of the cover 7 and serving to elevate the mass of butter in the magazine and serving as a support therefor, should it be desired to remove the latter. In practice the slide 52$^a$ is permitted to remain in the open position until the contents of the magazine 52 are exhausted and as the contents of the magazine are under pressure of the weight 53 it will move downwardly whenever the slide 7 is withdrawn.

A yielding connection between the shaft 11 and the arm 49 is provided to permit the rotation of the shaft 11 in a reversed direction when the above described operations are performed, said connections comprising a coil spring 49ª, which holds the lever 49 against a stop projection 49ᵇ on the shaft.

Plastic material, especially butter, in the mass possesses such a coefficient elasticity that it is difficult to measure off successive small portions of equal size when a large portion of the material to be dispensed is put under pressure and to overcome this difficulty I have provided the above described mechanism whereby small portions of the material may be separated from the larger source of supply, and be received and retained in a separate compartment and there subjected to the pressure which will cause it to flow outward.

When the container 52 is empty it is removed and a full container inserted. After the empty plates are entirely exhausted from the plate carrier it is recharged by inserting plates from the top. While I have shown a specific embodiment of the invention, it is to be understood that it is not limited in scope to the present disclosure, inasmuch as the various coöperative elements may be modified and departed from as to structure without effecting the principle of operation involved, or the purposes intended to be accomplished, as contemplated by the claims appended hereto.

I claim as my invention:

1. In a dispensing apparatus, the combination with a container having a discharge opening, of an ejector movable therein, a cutting member traversing the discharge opening, a plate support arranged beneath the latter, a rotary plate carrier arranged above the support, having a plurality of plate holding sections, said carrier being automatically rotated when the plates in one section are exhausted to bring another section of plates into operative position, and feeding instrumentalities operating to release a plate from the carrier at each operation of the cutting member.

2. In a dispensing apparatus, the combination with a container having a discharge opening, of an ejector movable in the container, a cutting member traversing the discharge opening, a stationary plate support arranged beneath the discharge opening, a rotary plate carrier arranged above the support, having a plurality of plate holding sections on the carrier, the carrier being automatically rotated when the plates in one section are exhausted to bring another section of plates into operative position, and plate retaining means coöperating with the plates on the carrier to hold them, said retaining means including a releasing device movable to release the lowermost plate at each operation of the cutting member.

3. A magazine for dispensing machines comprising a casing having a central compartment adapted to receive a container and forming a surrounding chamber adapted to contain a cooling medium, and plate compartments located in said chamber.

4. A magazine for dispensing machines, comprising a casing having outer and inner walls forming an inner compartment adapted to receive a container and a surrounding chamber, and a plurality of separate compartments adapted to receive plates, disposed in said chamber.

5. A butter dispensing machine comprising a supply container, a discharge compartment having an outlet, means for expelling butter from the latter and a chamber containing a cooling medium arranged relatively to the container and compartment and disposed to maintain a lower temperature in the container than that of the compartment.

6. A butter dispensing machine comprising a supply container, a discharge compartment having an outlet, means for expelling the butter from the latter and a chamber containing a cooling medium arranged relatively to the container and compartment and disposed to maintain a lower temperature in the container than that of the compartment, and a plate magazine located contiguous to said chamber.

7. In a dispensing machine, the combination with a container adapted to hold a quantity of butter, of a discharge compartment having an outlet and adapted to hold a relatively smaller quantity of butter, a slide for cutting off and separating the two portions of the mass of butter and means for expelling the smaller portion from its compartment.

8. In a dispensing machine, the combination with a container having a discharge opening at one end, of a slide movable across one end of the container in proximity to said opening and separating the material within the container into two parts, means for expelling one of said parts through the discharge opening and means for maintaining the other part of said material at a lower temperature.

9. In a dispensing machine, the combination with a container having a discharge opening, and a slide for separating from the body of the material in the container a relatively smaller portion in the vicinity of said opening, of an ejector coöperating with the latter to expel the material therethrough and a member for operating the ejector also arranged to control the slide.

10. In a dispensing machine, the combination with a container having a discharge opening and a slide for separating from the body of the material in the container a relatively smaller portion in the vicinity of said opening, of an ejector coöperating with the latter to expel the material therethrough, an operating member coöperating with both the slide and ejector and arranged to first close the slide and thereafter cause the advance intermittent movement of the ejector.

11. In a dispensing apparatus, the combination with a container open at the top and having a discharge opening at its lower end and a slide for separating from the body of the material a relatively smaller portion in the lower end of the container, of an ejector in said lower end of the container, means for advancing it and means for forcing material in the upper portion of the container into its lower end when the slide is withdrawn.

BENNETT D. STRAIGHT.

Witnesses:
G. WILLARD RICH,
RUSSELL B. GRIFFITH.